J. W. P. BOETTCHER.
VEHICLE.
APPLICATION FILED APR. 17, 1908.
907,562.
Patented Dec. 22, 1908.
2 SHEETS—SHEET 2.
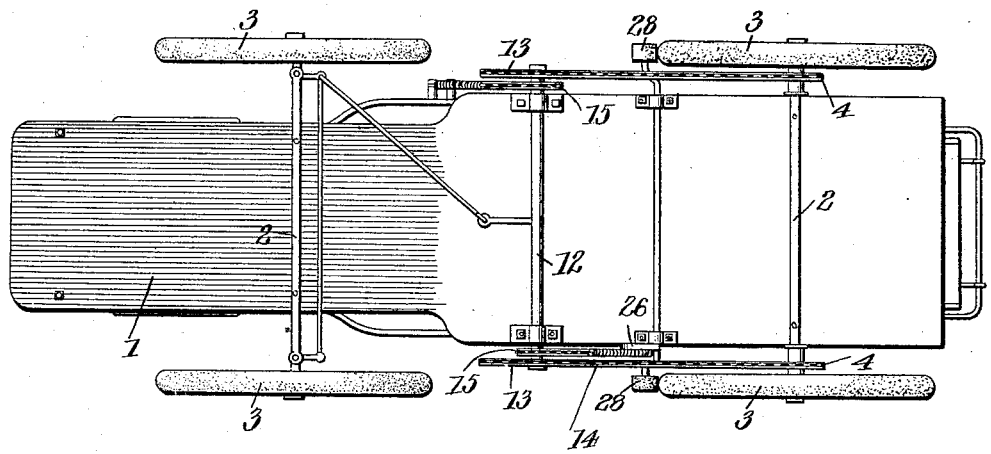
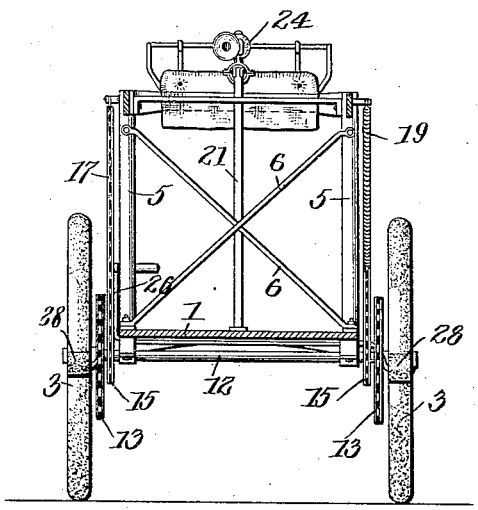
WITNESSES
Samuel E. Wade.
C. E. Traenor
INVENTOR
JOHN W. P. BOETTCHER.
BY
ATTORNEYS

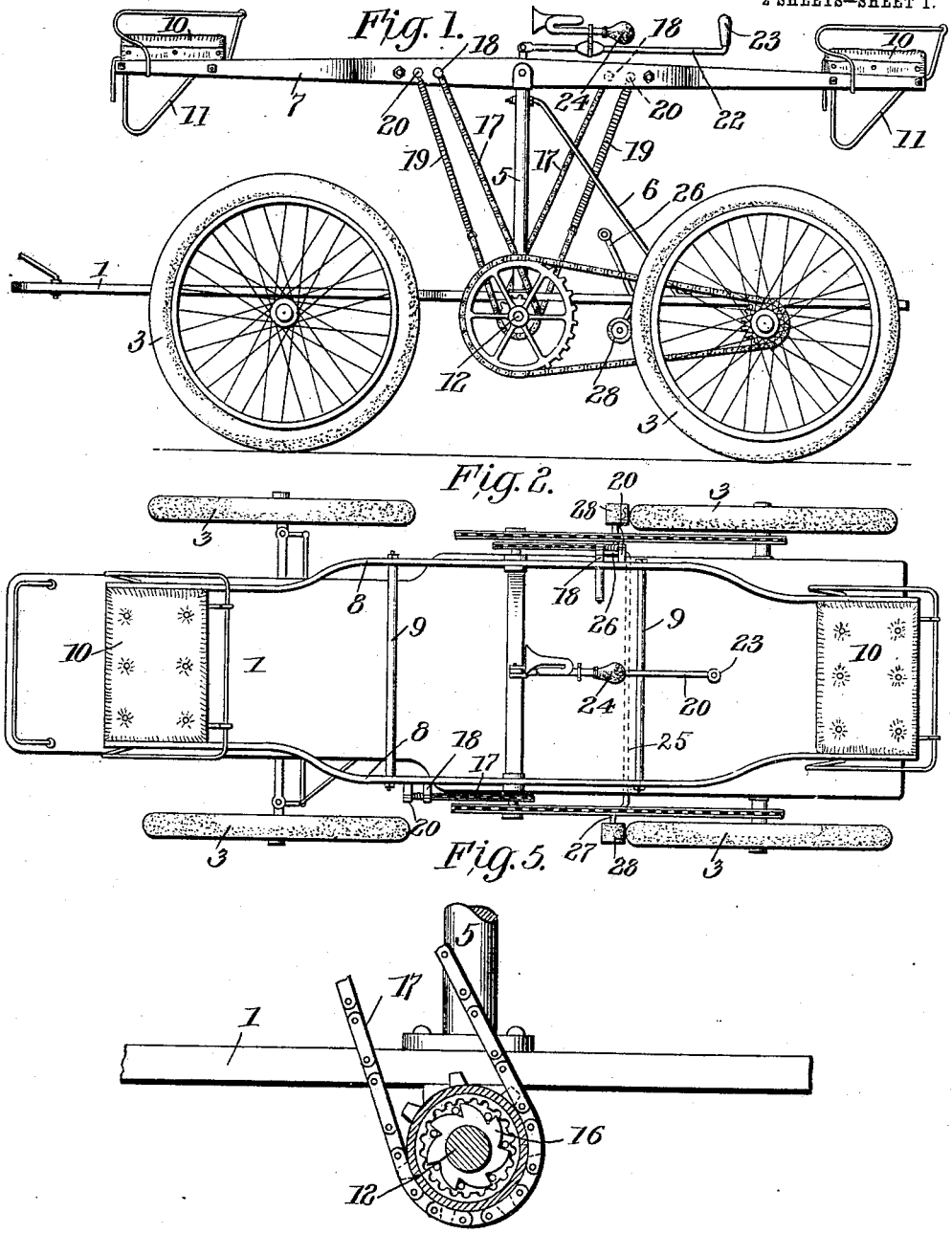

UNITED STATES PATENT OFFICE.

JOHN W. P. BOETTCHER, OF ELIZABETH CITY, NORTH CAROLINA.

VEHICLE.

No. 907,562.   Specification of Letters Patent.   Patented Dec. 22, 1908.

Application filed April 17, 1908. Serial No. 427,753.

*To all whom it may concern:*

Be it known that I, JOHN W. P. BOETTCHER, a citizen of the United States, and a resident of Elizabeth City, in the county of Pasquotank and State of North Carolina, have made certain new and useful Improvements in Vehicles, of which the following is a specification.

My invention is an improvement in vehicles and consists in certain novel constructions and combinations of parts hereinafter described and claimed.

Referring to the drawings forming a part hereof—Figure 1 is a side view of the improvement. Fig. 2 is a top plan view. Fig. 3 is a bottom plan view. Fig. 4 is a transverse section taken in front of the driving shaft and looking toward the rear, and Fig. 5 is a detail sectional view of the pawl and ratchet mechanism.

The present embodiment of my invention comprises a buck-board body 1, having transverse shafts 2 connected therewith near each end, and wheels 3 are journaled on the ends of the shafts, the rear wheels having sprockets 4 secured to the inner face of the hubs thereof. A pair of brackets 5, are secured to the sides of the body at their centers, the brackets being supported by braces 6, and a rocking frame 7 is journaled on the brackets.

The frame 7 consists of the side bars 8, connected by cross bars 9, and is provided at each end with a seat 10, both of the seats facing toward the front, and being provided on their bottom with a step or bracket 11, for engagement with the body, to limit the swinging motion of the frame.

A driving shaft 12 is journaled transversely of the body at its center, and upon each end of the shaft is secured a sprocket wheel 13, connected by a sprocket chain 14, with the sprocket wheels 4 before mentioned.

Inside of each of the sprocket wheels 13, is journaled a sprocket wheel 15, adapted to be connected with the shaft 13 when the said shaft is moving forwardly by a pawl and ratchet mechanism 16, the said sprocket wheel 15 being driven by a sprocket chain 17 secured at one end to the rocking frame as at 18, and by its other end to one end of a coil spring 19, the other end of the coil spring being connected with the rocking frame adjacent the connection of the other end of the chain as at 20.

It will be observed from the drawings that one of the sprocket chains is connected with the rocking frame in front of the bracket 5, while the other is connected with the frame at the rear of the said bracket. When the rocking frame is rocked, one end of the sprocket chain 17 being fixed, the sprocket wheel 15 will be rotated, and through the pawl and ratchet mechanism such rotation will be imparted to the shaft 12, provided the rotation is in a forward direction. When the front end of the frame is depressed, the right hand sprocket wheel will be rotated in a forward direction, and when the rear end is depressed the left hand sprocket wheel will be rotated in a forward direction, and through the pawl and ratchet mechanism such motion will be imparted to the driving shaft. The reverse motion of the sprocket wheels does not affect the shaft because of the interposition of the pawl and ratchet mechanism.

The front axle is of the usual construction of such axles in automobiles, the wheels being journaled on stub shafts pivoted to the body of the axle, and the usual steering mechanism is connected with the stub shafts, the said mechanism being operated by a vertical rod 21, provided with an angular handle 22, having a grip 23 thereon adjacent to the rear seat, and the usual horn 24 is connected with the steering handle. A brake is also provided, the said brake consisting of a shaft 25 journaled beneath the body, and provided near one end with a cranked portion, and at each end with cranked portions 27, the cranked portions 27 being provided with rollers 28 for engaging the tires of the rear wheel. The cranked portion is for engagement by the feet of the rear rider, whereby to operate the brake.

I claim—

1. A vehicle comprising a wheel supported body, a bracket on each side of the body at the center thereof, a frame arranged longitudinally of the body and mounted to rock on the brackets, the frame being provided at each end with a seat, a shaft journaled on the body at the center thereof, a driving connection between the ends of the shaft and the rear wheels, a sprocket wheel journaled on the shaft near each end thereof, a pawl and ratchet connection between each of the sprocket wheels and the shaft, to connect the wheels with the shaft when said wheels are rotated in a forward direction, a sprocket chain passing over each wheel, the chain on one wheel having its ends connected with one end of the frame, and the other chain with the opposite end of the frame, and a spring interposed in the length of each chain near one end thereof.

2. A vehicle comprising a wheel supported body, a frame mounted to rock on the body and provided at each end with a seat, a shaft journaled on the body at the center thereof, a driving connection between the ends of the shaft and the rear wheels, a sprocket wheel journaled on the shaft near each end thereof, a pawl and ratchet connection between each of the sprocket wheels and the shaft, to connect the wheels with the shaft when said wheels are rotated in a forward direction, a sprocket chain passing over each wheel, the chain on one wheel having its ends connected with one end of the frame, and the other chain with the opposite end of the frame, and a spring interposed in the length of each chain near one end thereof.

JOHN W. P. BOETTCHER.

Witnesses:
GEORGE F. WRIGHT,
C. W. ASHCRAFT.